US009070158B1

(12) United States Patent
Parihar et al.

(10) Patent No.: US 9,070,158 B1
(45) Date of Patent: Jun. 30, 2015

(54) ADAPTIVE INFORMATION REGIONS DISPLAYING CONTENT ASSOCIATED WITH AN ELECTRONIC COMMERCE SYSTEM

(75) Inventors: Sunil Singh Parihar, Renton, WA (US); Stefan M. Haney, Seattle, WA (US); Tobin J. Weldele, Seattle, WA (US); Alexander Hristov, Seattle, WA (US); John E. Darrow, Shoreline, WA (US); Stuart Ross Hobbie, Seattle, WA (US); Dylan Nooney, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 533 days.

(21) Appl. No.: 13/404,344

(22) Filed: Feb. 24, 2012

(51) Int. Cl.
*G06Q 30/00* (2012.01)
*G06Q 30/06* (2012.01)

(52) U.S. Cl.
CPC ................ *G06Q 30/0641* (2013.01)

(58) Field of Classification Search
CPC .................................. G06Q 30/0641
USPC .......................................... 705/27.1
See application file for complete search history.

(56) References Cited

U.S. PATENT DOCUMENTS 8,355,954 B1 * 1/2013 Goldberg et al. ............ 705/26.1

* cited by examiner

*Primary Examiner* — Yogesh C Garg
(74) *Attorney, Agent, or Firm* — Thomas Horstemeyer, LLP

(57) ABSTRACT

Disclosed are various embodiments for displaying content associated with a merchant selling items through an electronic commerce system. A display area includes multiple information regions presenting content associated with the merchant. Visual characteristics associated with the information regions adjust according to values corresponding to the to the information regions. For example, the sizes or positions of the information regions may adjust according to the values.

20 Claims, 6 Drawing Sheets

ADAPTIVE INFORMATION REGIONS DISPLAYING CONTENT ASSOCIATED WITH AN ELECTRONIC COMMERCE SYSTEM

BACKGROUND

A merchant may sell items, such as goods and services, through an electronic commerce system. The electronic commerce system may track various data associated with the activity of the merchant.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

An electronic commerce system may provide a platform (e.g., a "seller portal") through which a merchant may manage its operations. For example, the platform may facilitate the merchant overseeing its inventory and listings of items that are sold through the electronic commerce system. Additionally, the platform may present various metrics and information associated with the activity of the merchant. For example, the merchant may view information tracking its inventory history. Additionally, the platform may provide ways for the seller to improve its profitability. However, it may be the case that particular information is more urgent or relevant to a user than other information. As such, the present disclosure is directed towards providing and rendering a user interface that may facilitate directing a user to matters that may be more important, relevant, or urgent than other information.

As a non-limiting example, a user interface is provided that includes multiple regions that display information associated with a merchant in conjunction with an electronic commerce system. A value may be determined for each region, wherein the value is based on, for example, a level of importance associated with the data presented in the region. The system disclosed herein may cause one or more of the regions to automatically adjust in size and/or location based on the determined value. Thus, the merchant may be directed to information that is more important, relevant, or urgent than other information. In the following discussion, a general description of the system and its components is provided, followed by a discussion of the operation of the same.

Figure 1:
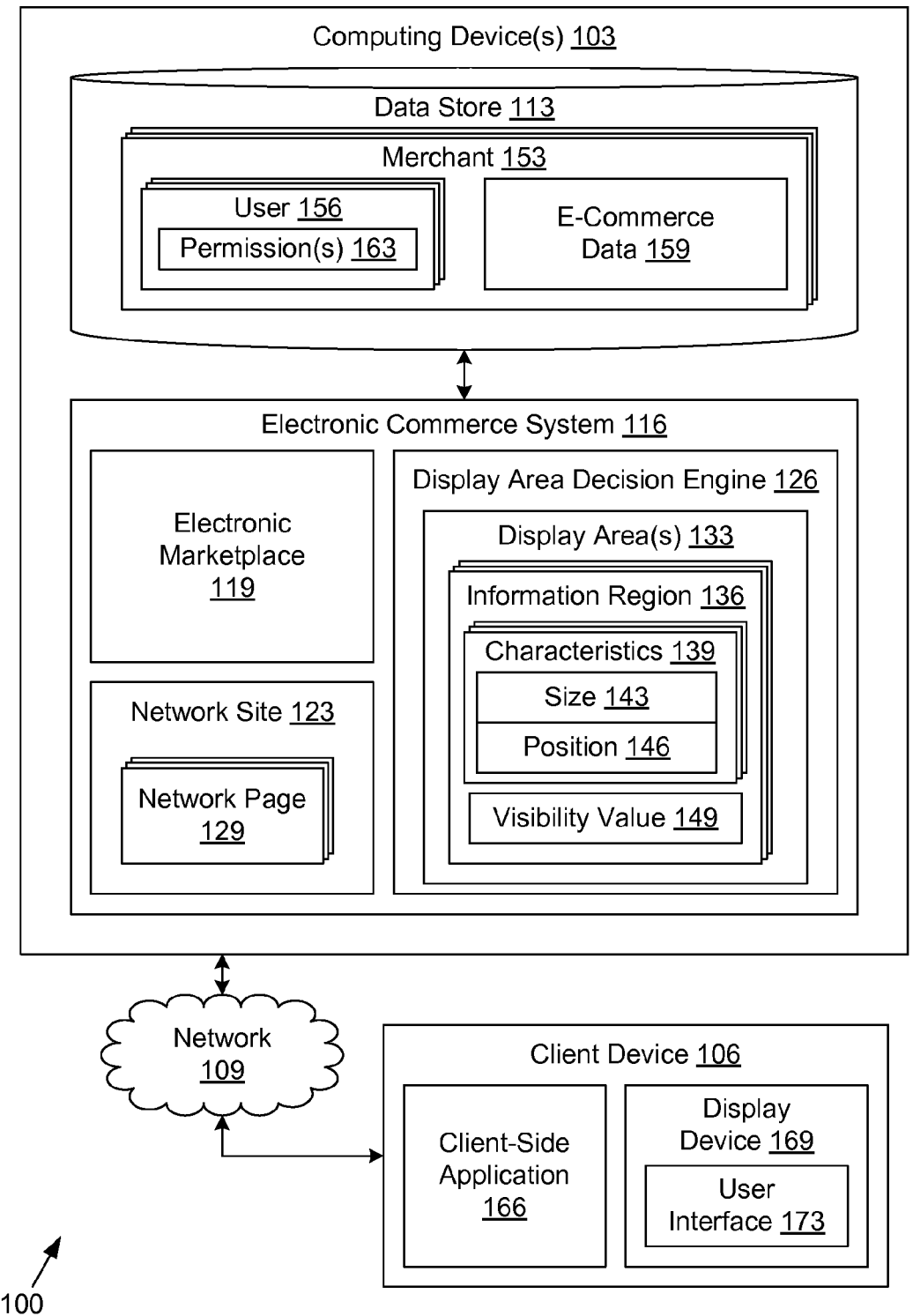
FIG. 1 is a drawing of a networked environment according to various embodiments of the present disclosure.

With reference to FIG. 1, shown is a networked environment 100 according to various embodiments. The networked environment 100 includes one or more computing devices 103 and one or more client devices 106 coupled through a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores 113 as can be appreciated. The data stored in the data store 113 for example, is associated with the operation of the various applications and/or functional entities described below.

The components executed on the computing device 103, for example, include an electronic commerce system 116, and other applications, services, processes, systems, engines, or functionality not discussed in detail herein. The electronic commerce system 116 may be executed to facilitate the sale and purchase of items, such as goods and services, through the network 109. As such, the electronic commerce system 116 may provide an electronic marketplace 119, a network site 123, a display area decision engine 126, and other functionality and/or environments not discussed in detail herein.

The electronic marketplace 119 provides a platform for items to be bought and sold over the network 109. The electronic commerce system 116 may generate the network site 123 to provide a network presence for the electronic marketplace 119. To this end, the network site 123 may encode for display at least one network page 129 that facilitates the client device 106 accessing the electronic commerce system 116 and other associated functionality. The network site 123 may include a network page server to serve data such as the network pages 129 and other data to client devices 106 over a protocol such as hypertext transfer protocol (HTTP), simple object access protocol (SOAP), and/or other protocols. Such a network page server may comprise a commercially available network page server such as, for example, Apache® HTTP Server, Microsoft® Internet Information Services (IIS), and/or other network page servers.

The display area decision engine 126 may be executed to generate and/or process various data associated with one or more display areas 133. As will be further discussed, the display areas 133 may present visual depictions of information related to activity associated with the electronic commerce system 116. In this sense, the display area 133 may be considered a "dashboard" that presents information, such as metrics, alerts, messages, and/or other information.

Associated with each display area 133 may be multiple information regions 136 that present a grouping of related information. The information regions 136 in various embodiments may be embodied in the form of "widgets," as may be appreciated. As non-limiting examples, one information region 136 may present information related to an item inventory, while another information region 136 may present information related to customer feedback.

Associated with each information region 136 may be one or more characteristics 139 corresponding to the respective information region 136. For example, the characteristics 139 may be the size 143, position 146, and/or other characteristics 139 of the information region 136. The size 143 of the information region 136 may be a value, such as a length, width, area, etc. The size 143 may be expressed in terms of a specific number, in relation to other information regions 136, in relation to a device on which the information region 136 is rendered, or in other ways. It is emphasized that other characteristics 139 may be associated with the information regions 136 as well. For example, to ability to play audio, the ability for the information regions 136 to "blink," or other types of characteristics 139 may be associated with the information regions 136.

The position 146 may be a location of a particular information region 136. Similar to the size 143 of an information region 136, the position 146 may be expressed in various ways. For example, the position 146 may be expressed in relation to a device on which the information region 136 is displayed, as relative to other information regions 136, or in other ways.

The display area decision engine 126 may also calculate a visibility value 149 for the information region 136. The visibility value 149 may correspond to a level of importance, urgency, or other value that is determined by the electronic commerce system 116. As a non-limiting example, the visibility value 149 may be based on a monetary amount that stands to be lost or gained due to a condition corresponding to information presented in the information region 136.

The data stored in the data store 113 includes, for example, a listing of merchants 153 and potentially other data. The merchants 153 are entities, including third-party entities, that sell items through the electronic commerce system 116. Associated with each merchant 153 is a listing of users 156, electronic commerce data 159, and potentially other information not discussed in detail herein. A user 156 may be a particular person (or people) or other entity that is associated with the merchant 153. For example, the user 156 may be a specific person or the user 156 may represent a job function associated with one or more people.

Associated with each user 156 are one or more permissions 163. As will be discussed later, the permissions 163 may define whether a particular user 156 is entitled to access or view a particular information region 136. The permissions 163 may define whether specific information regions 136 or groups of information regions 136 are accessible or inaccessible, for example.

The electronic commerce data 159 may be information that is associated the merchant 153 and its activity in conjunction with the electronic commerce system 116. As non-limiting examples, the electronic commerce data 159 may be related to the inventory of items, the profits of the merchant 153, customer feedback, or any other information that may be of interest to the merchant 153 and/or electronic commerce system 116.

The client device 106 is representative of a plurality of client devices 106 that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, an electronic book reader, or other device with like capability.

The client device 106 may be configured to execute various applications, such as a client-side application 166 and other applications. The client-side application 166 may be executed in the client device 106, for example, to access and render network pages 129, such as web pages, or other network content served up by the computing device 103 and/or other servers. The client-side application 166 may be embodied in the form of a network browser (e.g., Microsoft® Internet Explorer, Mozilla® Firefox®, Apple® Safari®, etc.), as a stand-alone application, or as any other type of application. The client device 106 may be configured to execute applications beyond the client-side application 166, such as, for example, email applications, instant message applications, and/or other applications.

The client device 106 may include a display device 169 and other components not discussed in detail herein. The display device 169 presents various data associated with the client-side application 166 and/or other applications. The display device 169 may comprise, for example, one or more devices such as cathode ray tubes (CRTs), liquid crystal display (LCD) screens, light emitting diode (LED) screens, gas plasma-based panel displays, LCD projectors, or other devices of like capability.

Additionally, the display device 169 may present a user interface 173 generated by the client-side application 166 (and other applications) to present visual representations of information, input regions, functionality, control elements, etc. to facilitate interaction and control with the client device 106. As will be discussed later, the display area 133 and corresponding information regions 136 may be presented in the user interface 173.

Next, a general description of the operation of the various components of the networked environment 100 is provided. To begin, it is assumed that a merchant 153 sells items through the electronic commerce system 116, and the data store 113 is populated with the data corresponding to the merchant 153. Further, it is assumed that the client-side application 166 has been executed and is running on the client device 106.

A user 156 associated with the merchant 153 may wish to access the system described herein in order to oversee activities of the merchant 153. For example, the user 156 may access the system in order to update its inventory, to view statistical information regarding its sales history, to seek recommendations for improving its operations, or for other purposes. To this end, one or more display areas 133 may be encoded to present information, as will be described.

The display area decision engine 126 may determine which information regions 136 are to be included within the display area 133. To this end, the display area decision engine 126 may determine the identity of the user 156 and the associated permission(s) 163, for example. Using the permissions 163 data, the display area decision engine 126 may determine that a particular user 156 may or may not have the permissions to view one or more particular information regions 136. For example, the display area decision engine 126 may determine that the user 156 is a shipping handler and is therefore not entitled to view metrics associated with the profitability of the merchant 153.

In various embodiments, the user 156 may also define which information regions 136 are to be displayed. To this end, settings parameters may be provided in which a user 156 may identify the information regions 136 that are to be included.

Once it is determined which information regions 136 are to be included in the display area 133, the display area decision engine 126 may initiate the process of determining visibility values 149 for each of the information regions 136. As discussed above, the visibility values 149 may be based on one or more criteria, such as a level of importance, urgency, or other value. For example, it may be that a first information region 136 presents information indicating that an action is suggested to be performed within a specified time period (e.g., within the next 24 hours), while a second information region 136 presents information associated with the profitability of the merchant 153 (and thus immediate action is not suggested to resolve an issue). In such a case, a visibility value 149 for the first information region 136 may be higher than the visibility value 149 of the second information region.

Additionally, the visibility values 149 may be based on parameters set by the user 156. For example, the user 156 may prefer to view information related to the profitability of the merchant 153 over viewing the status of item shipments. In such a case, the display area decision engine 126 may assign a high visibility value 149 to an information region associated with the profits of the merchant 153.

Even further, the visibility values 149 may be based on the type of client device 106 on which the information regions 136 may be presented. For example, the display area decision engine 126 may recognize that a particular client device 106 has a relatively large display device 169. In such a case, the visibility values 149 for several information regions 136 may be relatively higher than other information regions 136. On the other hand, if the client device 106 has a relatively small display device 169, fewer information regions 136 may be determined to have a relatively high visibility value 149.

Also, the visibility values 149 may be based at least in part on the client device 106 type. For example, when using a handheld device, it may be difficult for a merchant 153 to perform actions that would resolve several issues indicated in the information regions 136 using the relatively small handheld device. Thus, the display area decision engine 126 may determine that a relatively small number of the information regions 136 have a visibility value 149 that is higher than the other information regions 136.

The visibility values 149 may also be based at least in part on rankings from users 156. To this end, users 156 may vote on, or assign scores to, one or more information regions 136 to indicate their perceived level of importance of the particular information regions 136. The visibility values 149 for the information regions 136 may be increased or decreased based on these accumulated rankings. Furthermore, the rankings from users 156 may be categorized based on, for example, the merchant 153, the types of items the merchant 153 sells, or any other category. For example, the rankings that are considered when calculating the visibility values 149 may be limited to the rankings given by a selected group of users 156, or the rankings from all of the users 156 associated with the electronic marketplace 119 may be considered.

Once the display area decision engine 126 has determined the visibility values 149 for the information regions 136, the electronic commerce system 116 may determine one or more characteristics 139, such as the sizes 143 and/or positions 146, for the information regions 136 based at least in part on the visibility values 149. As a non-limiting example, the sizes 143 of the information regions 136 may be proportional to their visibility values 149. In alternative embodiments, information regions 136 with visibility values 149 that exceed a predefined threshold may have characteristics 139 that are modified from an initial value, while information regions 136 with visibility values below the threshold have characteristics 139 that remain at their initial values.

In the event that an information region 136 is adjusted in size 143, the contents displayed in the information region 136 may be scaled to correspond with the updated size 143. In alternative embodiments, contents may be added or removed, as may be appreciated. To the extent that the contents displayed in an information region 136 have been resized, the user 156 may be provided a way to resize the content in order to facilitate the user 156 reading or perceiving the content. For example, the user 156 may be able to select a button that resizes the content, or the content may automatically resize upon the user 156 hovering a cursor over the information region 136.

Once the characteristics 139 of the information regions 136 have been determined, the display area decision engine 126 may associate the information regions 136 with specific locations on the display area 133. Various techniques may be used in associating the information regions 136 with the display area 133. For example, a template may be used, the associations may be randomized, the associations may be based on predefined criteria, or other techniques may be used.

In the event that the position 146 of an information region 136 has been defined, the information region 136 may be associated with a location of the display area 133 in accordance with the defined position 146 value. Alternatively, if the position 146 is not defined, the display area decision engine 126 may associate the information region 136 to a location based at least in part on the visibility value 149. For example, if the visibility value 149 is relatively high and/or exceeds a threshold, the information region 136 may be assigned to a location that is more likely to be quickly viewed by a user 156, such as at the center of the display area 133.

After the information regions 136 have been associated with locations of the display area 133, the corresponding data may be encoded for display. The encoded data may be transmitted to and received by the client device 106. Thereafter, the display area 133 may be may be rendered as at least part of the user interface 173 presented on the display device 169. The display area 133 and information regions 136 may then be updated from time to time.

In various embodiments, the characteristics 139, such as but not limited to the sizes 143 and positions 146, of the information regions 136 may be modified by the user 156 before or after the information regions 136 are displayed. For example, the user 156 may resize the information regions 136, adjust the positions 146 of the information regions 136, or perform other modifications. Additionally, the user 156 may add or remove particular information regions 136. Accordingly, the user 156 may generate display areas 133 that are customized to individual preferences.

The generated display areas 133, information regions 136, and the corresponding characteristics 139 may be saved as a template for later use or to share with other users 156. Additionally, the electronic commerce system 116 may provide preexisting templates for the users 156 to use. A user 156 may select one of the saved templates, and the corresponding display area 133, information regions 136, and their corresponding characteristics 139 may be generated, as described above.

Even further, audio may be generated that corresponds to the generated display areas 133 or individual information regions 136. The generated audio may be, for example, a reading of the information presented or a summary thereof. Additionally, the order of the audio presented may be based at least in part onto the visibility values 149 of the information regions 136. As a non-limiting example, a summary of the information region 136 having the greatest visibility value 149 may be read upon the information region 136 being rendered on the client device 106.

Figure 2A:
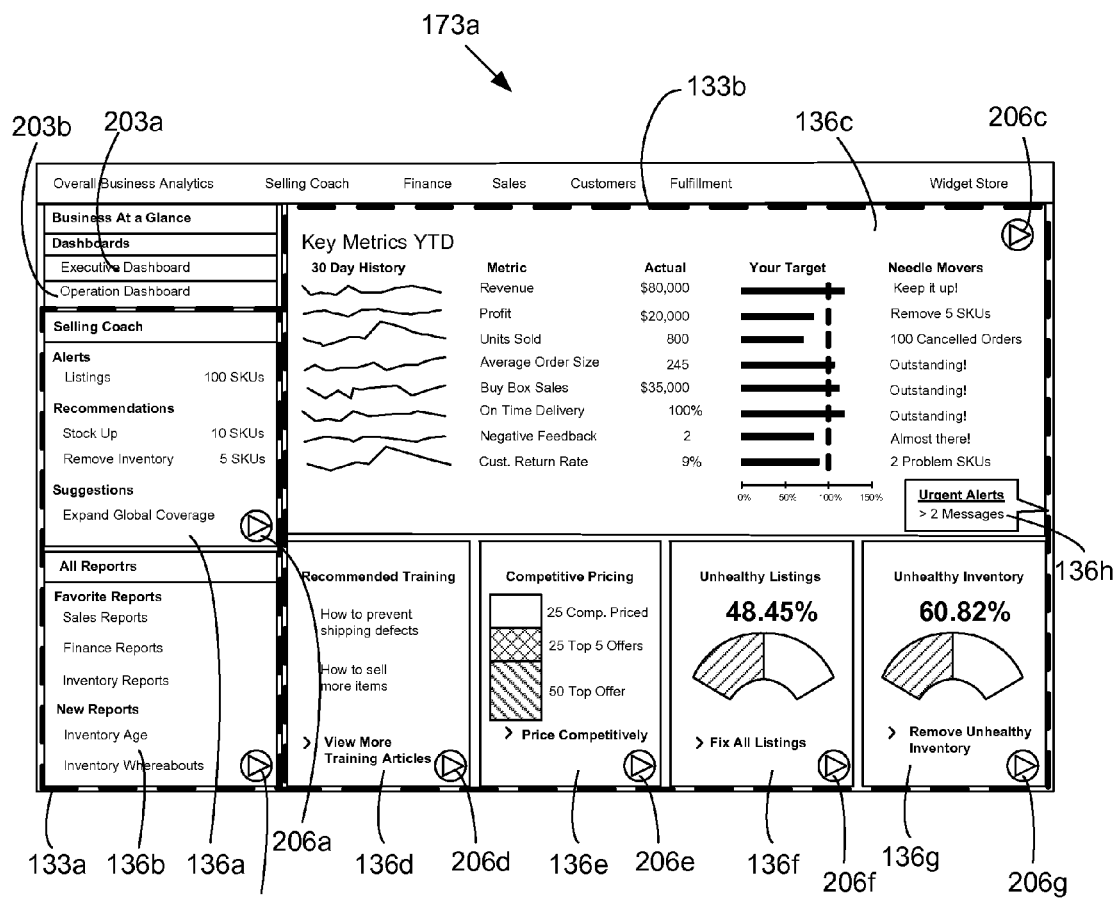
FIGS. 2A-2C are drawings of examples of a user interface rendered by a client device in the networked environment of FIG. 1 according to various embodiments of the present disclosure.

Referring next to FIG. 2A, shown is one example, among others, of a user interface 173 (FIG. 1), hereinafter referred to as user interface 173a, that may be rendered on the display device 169 (FIG. 1). The layout of the user interface 173a shown may be generated, for example, with the characteristics 139 (FIG. 1) of the information regions 136 (FIG. 1) being at their initial values. It is understood that the user interface 173a shown provides merely one example of the many types of features, functions, and arrangements that may be used in accordance with the present disclosure.

The user interface 173a includes multiple display areas 133, hereinafter referred to as display areas 133a and 133b (represented by dashed rectangles), multiple dashboard selector buttons 203a and 203b, and other features not discussed in detail herein. The dashboard selector buttons 203a and 203b facilitate changing the user 156 (FIG. 1) for which the information regions 136 may be generated. For example, selecting the dashboard selector button 203a may cause the visibility values 149 (FIG. 1) to correspond to a user 156 being an executive associated with the merchant 153 (FIG. 1), while selecting the dashboard selector button 203b may cause the visibility values 149 to correspond to a user 156 being a shipping handler.

The display area 133a includes multiple information regions 136, hereinafter referred to as information regions 136a-136b. The display area 133b includes multiple information regions 136, hereinafter referred to as information regions 136c-136h. In the example shown, the information regions 136a and 136b are capable of having their positions 146 being adjusted, but the sizes 143 of the information regions 136a and 136b are static. The information regions 136c-136h, however, are configured to be adaptive in both size 143 and position 146. It is emphasized that, although the information regions 136 shown are rectangular in shape, other shapes of information regions 136 may be generated as well.

The information regions 136a-136h also include play audio buttons 206a-206h. By selecting one of the play audio buttons 206a-206h, audio corresponding to the selected one of the information regions 206a-206h may be played on the client device 106 (FIG. 1). For example, the text displayed in the information region 206a-206h may be read aloud, or a summary of such information may be played.

As merely one example of content that may presented in conjunction with an information region 136, the information region 136f includes information relating to the overall status of item listings of a merchant 153 (e.g., the "health" of the listings). In the example shown, a listing may be considered satisfactory (i.e., "healthy"), for example, if an inventory of the item is plentiful. On the other hand, the listing may be unsatisfactory (i.e., "unhealthy") if the inventory is low. By selecting the "Fix All Listings" button/link, the unsatisfactory (i.e., "unhealthy") issues for the unsatisfactory (i.e., "unhealthy") items may be automatically resolved. As a non-limiting example, by selecting the "Fix All Listings" button/link, the electronic commerce system 116 may cause an order for additional inventory to be placed on behalf of the merchant 153.

The content of information region 136h includes a notification that there are urgent alerts for which immediate action is to be taken. These alerts may correspond to electronic notifications that have been sent to the merchant 153 (e.g., through electronic mail). It may be appreciated that the display areas 133a-133b as shown may not facilitate a user 156 being directed to matters for which immediate action is to be taken.

Figure 2B:
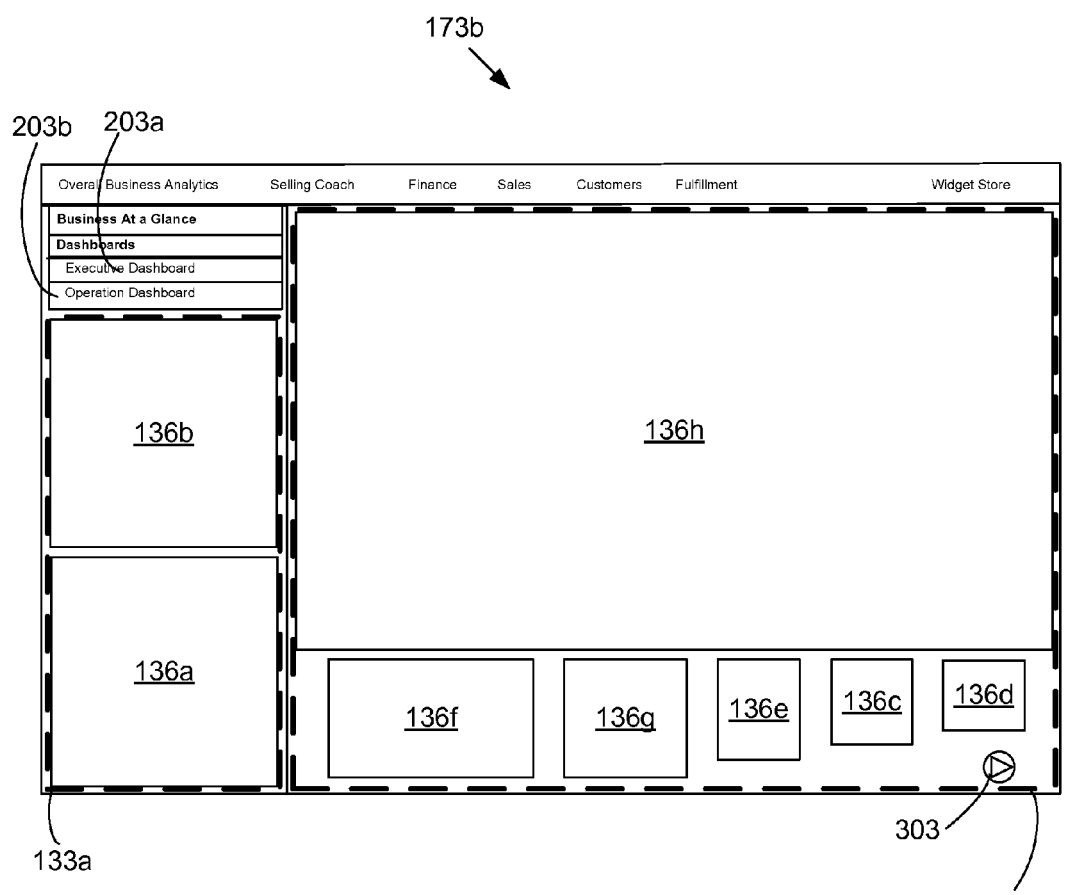

Referring next to FIG. 2B, shown is one example, among others, of a user interface 173 (FIG. 1), hereinafter referred to as user interface 173b, that may be rendered on the display device 169 (FIG. 1). In FIG. 2B, the contents displayed in the information regions 136a-136h have been omitted in order to emphasize the functionality of the adaptive information regions 136. The layout of the user interface 173a shown may be generated, for example, upon calculating and applying the visibility values 149 (FIG. 1). It is understood that the user interface 173b shown provides merely one example of the many types of features, functions, and arrangements that may be used in accordance with the present disclosure.

In FIG. 2B, the display area decision engine 126 has determined that the information region 136b has a higher visibility value 149 (FIG. 1) than information region 136a. Accordingly, the display area decision engine 126 has placed the information region 136b in a location that was determined to be more visually prominent than the location of information region 136a (i.e., information region 136b is now "above" information region 136a).

Similarly, the display area decision engine 126 has determined that the information regions 136c-136h correspond to visibility values 149 that are in the following descending order: information region 136h, information region 136f, information region 136g, information region 136e, information region 136c, and information region 136d. Thus, the display area decision engine 126 has associated the information regions 136c-136h to the display area 133b as shown in FIG. 2B. It is noted that the display area decision engine 126 has adjusted the size 143 (FIG. 1) of the information region 136h to be larger than the information regions 136f, 136g, 136e, 136c, and 136d. Further, the display area decision engine 126 has reduced the sizes 143 of the information regions 136f, 136g, 136e, 136c, and 136d. Also, the display area decision engine 126 has associated the information region 136h to be in a position 146 that has been determined to be the most visually prominent.

The display area 133b also includes a play audio button 303. Upon selecting the play audio button 303, audio corresponding to one or more of the information regions 136c-136h may be played on the client device 106 (FIG. 1). The audio that is played may be based at least in part on the visibility values 149 of the information regions 136c-136h. As a non-limiting example, audio corresponding to the N information regions 136c-136h having the greatest visibility values 149 may be played, where N is a predefined number. In various alternative embodiments, the audio may be played automatically, without the user 156 selecting the play audio button 303.

Figure 2C:
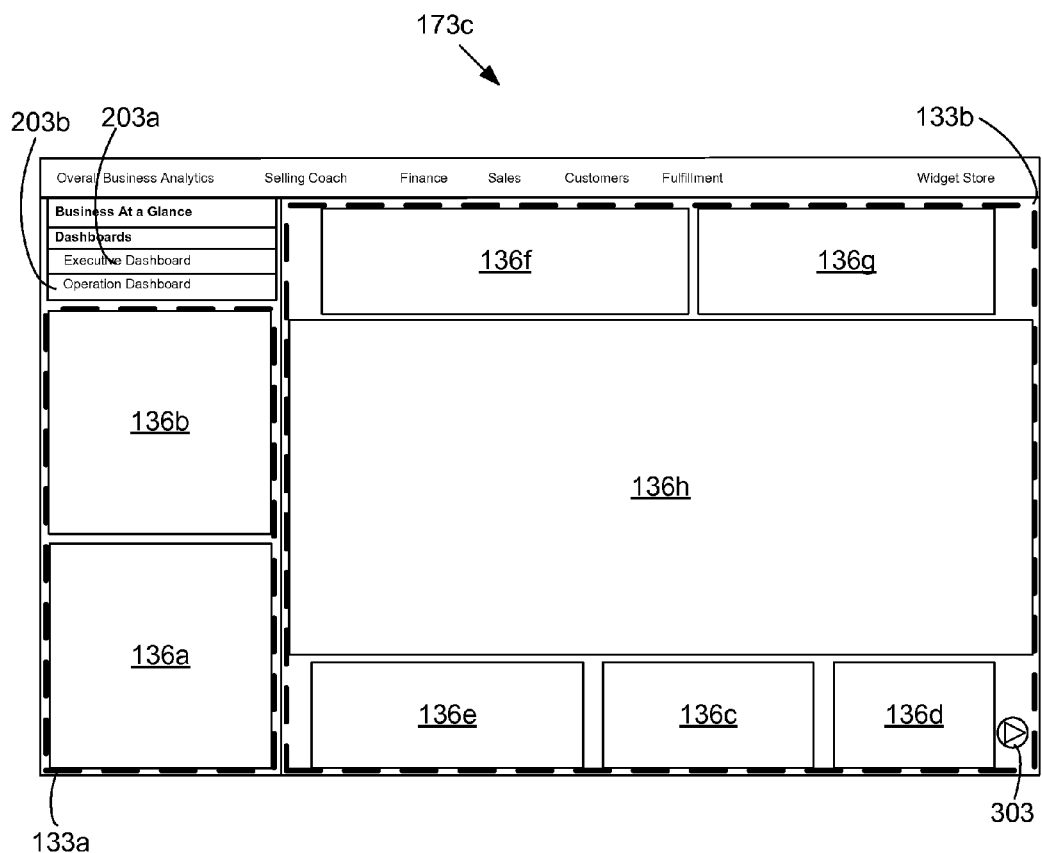

Referring next to FIG. 2C, shown is another example, among others, of a user interface 173 (FIG. 1), hereinafter referred to as user interface 173c, that may be rendered on the display device 169 (FIG. 1). In FIG. 2C, the contents displayed in the information regions 136a-136g have been omitted in order to emphasize the functionality of the adaptive information regions 136. The layout of the user interface 173c shown may be generated, for example, upon calculating and applying the visibility values 149 (FIG. 1). It is understood that the user interface 173c shown provides merely one example of the many types of features, functions, and arrangements that may be used in accordance with the present disclosure.

Similar to FIG. 2B, the display area decision engine 126 (FIG. 1) has determined that the information region 136b has a higher visibility value 149 (FIG. 1) compared to information region 136a. Accordingly, the display area decision engine 126 has placed the information region 136b in a location determined to be more visually prominent than the location of information region 136a (i.e., information region 136b is now "above" information region 136a).

As with FIG. 2B, the display area decision engine 126 has determined that the information regions 136c-136h correspond to visibility values 149 that are in the following descending order: information region 136h, information region 136f, information region 136g, information region 136e, information region 136c, and information region 136d. Thus, the display area decision engine 126 has associated the information regions 136c-136h to the display area 133b as shown in FIG. 2B. Additionally, the display area decision engine 126 has adjusted the sizes 143 (FIG. 1) of the information regions 136h to be larger than the other information regions 136f, 136g, 136e, 136c, and 136d. In addition, the display area decision engine 126 has determined that the information region 136d is not to be included in the display area 133b due to the limited area in the display area 133b.

Figure 3:
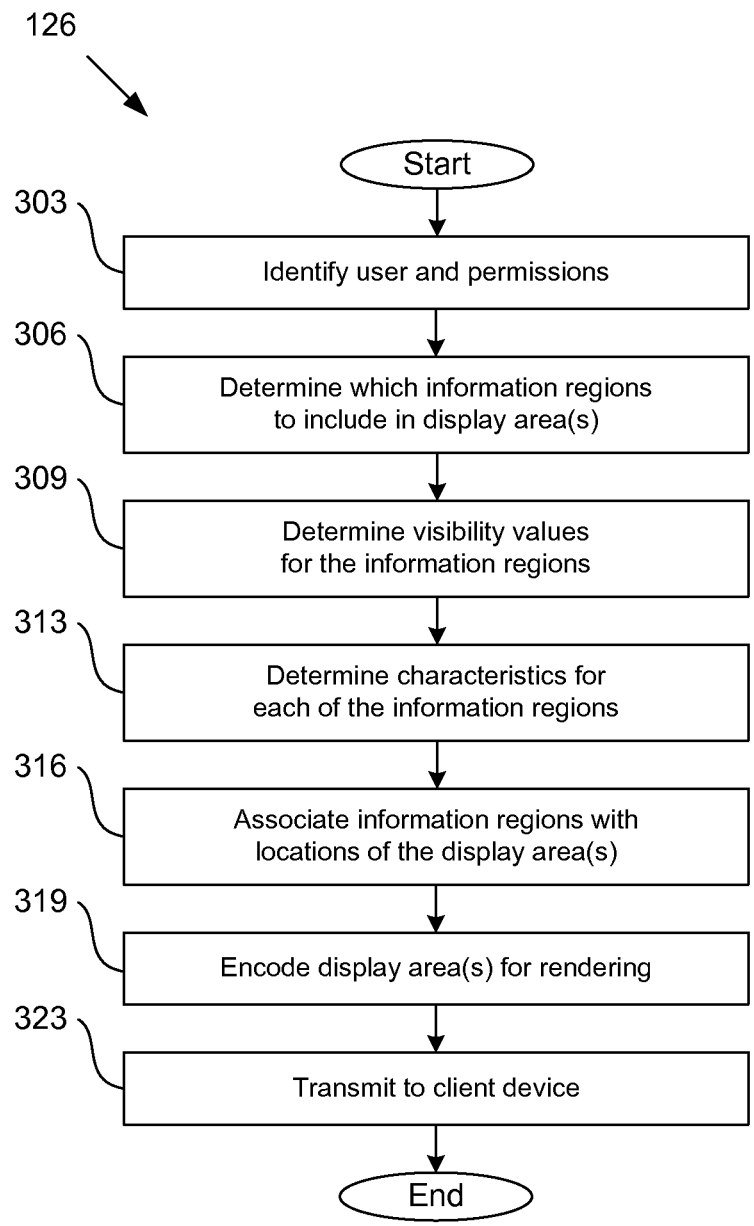
FIG. 3 is a flowchart illustrating one example of functionality implemented as portions of a display area decision engine executed in a computing device in the networked environment of FIG. 1 according to various embodiments of the present disclosure.

Referring next to FIG. 3, shown is a flowchart that provides one example of the operation of a portion of the display area decision engine 126 according to various embodiments. It is understood that the flowchart of FIG. 3 provides merely an example of the many different types of functional arrangements that may be employed to implement the operation of the portion of the display area decision engine 126 as described herein. As an alternative, the flowchart of FIG. 3 may be viewed as depicting an example of steps of a method implemented in the computing device 103 (FIG. 1) according to one or more embodiments.

Beginning with box 303, the display area decision engine 126 identifies the user 156 (FIG. 1) and determines the corresponding permissions 163 (FIG. 1) for the user 156. Next, as shown in box 306, the display area decision engine 126 determines which information regions 136 are to be included in the display area(s) 133 (FIG. 1), based on the user 156 and possibly other parameters.

Thereafter, the display area decision engine 126 determines the visibility values 149 (FIG. 1) for the information regions 136 (FIG. 1), as shown in box 309. The display area decision engine 126 then moves to box 313 and determines the characteristics 139 (FIG. 1), such as the size 143 (FIG. 1), position 146 (FIG. 1), and/or other characteristics 139 (FIG. 1), of the information regions 136.

Next, as depicted in box 316, the display area decision engine 126 associates the information regions 136 with locations of the display area(s) 133. The information regions 136 may be associated with the display area(s) 133, for example, randomly, based on the characteristics 139, based on the visibility values 149, or based on other criteria.

Thereafter, the display area decision engine 126 moves to box 319 and encodes the display area(s) 133 for rendering on the display device 169 (FIG. 1). Next, the encoded data is transmitted to the client device 106, as shown in box 323. Thereafter, the process ends.

Figure 4:
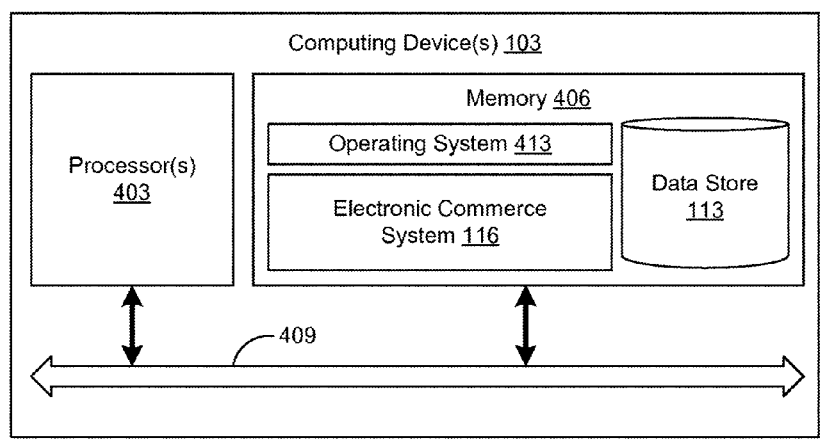
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce system 116 and potentially other applications. Also stored in the memory 406 may be the data store 113 and other data. In addition, an operating system 413 may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce system 116 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the display area decision engine 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 116, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program having instructions, which when executed in a computing device, cause the computing device to perform a method comprising:
   determining a plurality of values for a plurality of information regions, each of the information regions comprising content corresponding to a merchant in conjunction with an electronic commerce system;
   automatically adjusting a size and a position of at least one of the information regions based at least in part on a corresponding one of the values;
   automatically adjusting the size and the position of the at least one of the information regions based at least in part on one of the values exceeding a predetermined threshold; and
   associating each of the information regions with a plurality of locations of a display area based at least in part on the values, the locations corresponding to a template;
   wherein the values are based at least in part on:
      the content corresponding to each of the information regions;
      an identity of a user associated with the merchant; and
      a client device for which the display area is configured to be displayed.

2. The computer-readable medium of claim 1, wherein the program further causes the computing device to perform the method further comprising encoding for display the display area comprising the information regions.

3. The computer-readable medium of claim 2, wherein the program further causes the computing device to perform the method further comprising transmitting the encoded display area to the client device.

4. A system, comprising:
   at least one computing device; and
   at least one application executable by the at least one computing device, the at least one application causing the at least one computing device to perform a method comprising:
      determining a value for each of a plurality of information regions comprising content associated with a merchant in conjunction with an electronic commerce system;
      automatically adjusting a visual characteristic of at least one of the information regions based at least in part on the value corresponding to the at least one of the information regions; and associating each of the information regions with one of a plurality of locations of a display area, each of the locations having a predefined visual prominence level, wherein the associations are determined at least in part by the value corresponding to each of the information regions and by the predefined visual prominence level of each of the locations.

5. The system of claim 4, wherein automatically adjusting the visual characteristic of the at least one of the information regions further comprises adjusting a size of the at least one of the information regions.

6. The system of claim 4, wherein the at least one application further causes the at least one computing device to perform the method further comprising automatically adjusting the visual characteristic of the at least one of the information regions in response to the at least one of the information regions being adjusted.

7. The system of claim 4, wherein the value for each of the information regions is based at least in part on a type of client device for which the display area is configured to be displayed.

8. The system of claim 4, wherein the value for each of the information regions is based at least in part on an identity of a user.

9. The system of claim 4, wherein the value for each of the information regions is based at least in part on the content of the corresponding one of the information regions.

10. The system of claim 4, wherein the at least one application further causes the at least one computing device to perform the method further comprising automatically resolving an issue indicated in the content of one of the information regions.

11. A method, comprising:
    encoding, in at least one computing device, a display area comprising a plurality of information regions comprising content corresponding to a merchant associated with an electronic commerce system;
    automatically adjusting, in the at least one computing device, a visual characteristic of one of the information regions based at least in part on a value corresponding to the one of the information regions; and
    associating, in the at least one computing device, each of the information regions with one of a plurality of locations of the display area based at least in part on a ranking of the value for each of the information regions with respect to other ones of the plurality of information regions.

12. The method of claim 11, further comprising determining the value for each of the information regions.

13. The method of claim 12, wherein the value is based at least in part on the content for the corresponding one of the information regions.

14. The method of claim 12, wherein the value is based at least in part on an identity of a user.

15. The method of claim 12, wherein the value is based at least in part on a client device for which the display area is configured to be rendered.

16. The method of claim 11, wherein the value is based at least in part on a plurality of votes from a plurality of users associated with a plurality of merchants.

17. The method of claim 16, further comprising adjusting a size of the content corresponding to the one of the information regions.

18. The method of claim 11, wherein automatically adjusting the visual characteristic of one of the information regions further comprises adjusting the visual characteristic for at least one of the other ones of the plurality of information regions.

19. The method of claim 11, wherein the visual characteristic comprises an information region size.

20. The method of claim 11, wherein the visual characteristic comprises an information region position.

* * * * *